(12) United States Patent
Shieh

(10) Patent No.: US 7,775,198 B2
(45) Date of Patent: Aug. 17, 2010

(54) TWO-WAY PCV VALVE FOR TURBOCHARGED ENGINE PCV SYSTEM

(75) Inventor: Tenghua Tom Shieh, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 325 days.

(21) Appl. No.: 12/041,749

(22) Filed: Mar. 4, 2008

(65) Prior Publication Data
US 2009/0223498 A1 Sep. 10, 2009

(51) Int. Cl.
*F02M 25/06* (2006.01)
(52) U.S. Cl. ...................... 123/574; 123/563
(58) Field of Classification Search ......... 123/572–574, 123/41.86, 559.1, 563
See application file for complete search history.

(56) References Cited

U.S. PATENT DOCUMENTS

| | | | |
|---|---|---|---|
| 5,456,239 A * | 10/1995 | Henderson et al. | 123/563 |
| 6,405,721 B1 * | 6/2002 | Moren | 123/572 |
| 7,007,682 B2 | 3/2006 | Takahashi et al. | |
| 7,131,433 B1 | 11/2006 | Lindberg et al. | |
| 2003/0024512 A1 | 2/2003 | Kitano et al. | |
| 2003/0213479 A1 | 11/2003 | Wade | |
| 2004/0231651 A1 | 11/2004 | Wade et al. | |
| 2005/0000496 A1 * | 1/2005 | Norrick | 123/563 |
| 2005/0188968 A1 | 9/2005 | Duprez et al. | |
| 2006/0027218 A1 | 2/2006 | Cripps | |
| 2006/0180132 A1 | 8/2006 | Zhao et al. | |
| 2006/0236989 A1 | 10/2006 | Callahan | |
| 2007/0028904 A1 | 2/2007 | Duprez | |
| 2008/0083399 A1 * | 4/2008 | Hirano et al. | 123/572 |
| 2008/0110443 A1 * | 5/2008 | Hirano | 123/572 |

FOREIGN PATENT DOCUMENTS

| | | |
|---|---|---|
| GB | 1 578 370 | 11/1980 |
| KR | 20070044987 | 5/2007 |
| KR | 20070060912 | 6/2007 |

* cited by examiner

*Primary Examiner*—M. McMahon
(74) *Attorney, Agent, or Firm*—Gifford, Krass, Sprinkle, Anderson & Citkowski, P.C.

(57) ABSTRACT

A valve assembly controls the flow of boosted gas and naturally aspirated gas between an air inlet leading into an intercooler and an oil separator disposed in a head cover in a turbocharged motor vehicle engine. The valve assembly includes a housing defining a first channel through which the natural aspirated gas can pass and a second channel through which the boosted gas can pass. The housing encloses both a check valve and a PCV valve in the second channel. The check valve controls the flow of gas between the first and second channels during normal and boosted engine operation, respectively.

20 Claims, 4 Drawing Sheets

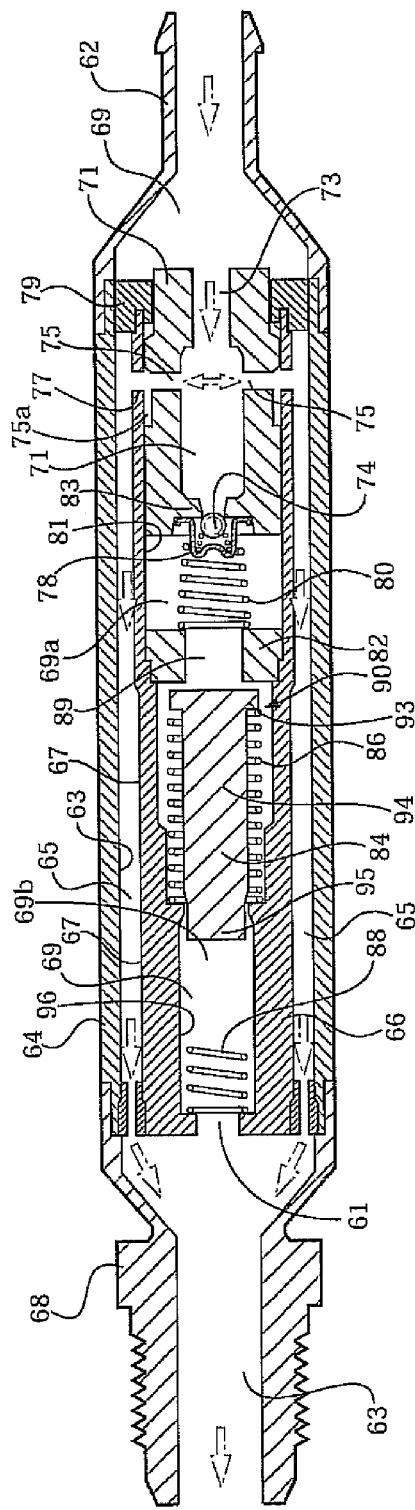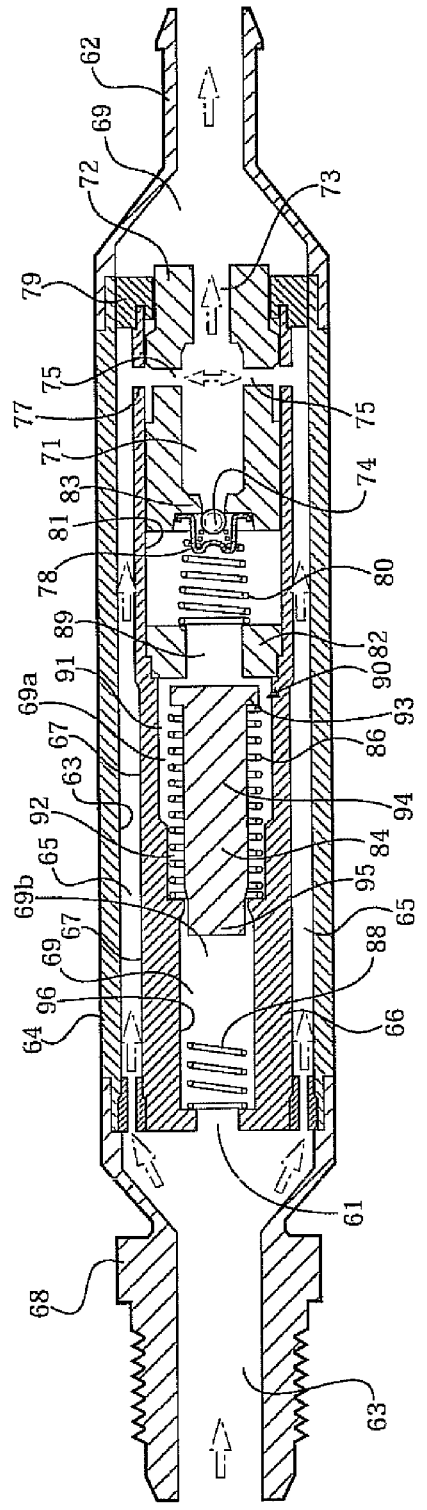
FIG-3
FIG-4

US 7,775,198 B2

TWO-WAY PCV VALVE FOR TURBOCHARGED ENGINE PCV SYSTEM

FIELD OF THE INVENTION

The invention relates to PCV valves for motor vehicles. More particularly, the invention relates to a two-way PCV valve and system for a turbocharged motor vehicle engine.

BACKGROUND OF THE INVENTION

An internal combustion engine typically includes a combustion chamber, where a fuel air mixture is burned to cause movement of a set of reciprocating pistons, and a crankcase, which contains the crankshaft driven by the pistons. During operation, it is normal for the engine to experience "blowby," wherein combustion gases leak past the pistons from the combustion chamber and into the crankcase. These combustion or blowby gases contain moisture, acids and other undesired byproducts of the combustion process.

Accordingly, a Positive Crankcase Ventilation (PCV) system is used to remove these harmful gases from the engine and prevent those gases from being expelled into the atmosphere. The PCV system does this by using manifold vacuum to draw vapors from the crankcase into the intake manifold. Vapor is then carried with the fuel/air mixture into an intake manifold of the combustion chambers where it is burned. Generally, the flow or circulation within the system is controlled by the PCV valve, which acts as both a crankcase ventilation system and as a pollution control device. Even with a PCV system, blowby gas may still collect within the engine cavity and further deteriorate ventilation, especially when the engine is running wide open throttle. When the engine is operating at wide open throttle, the manifold pressure is at the same level of engine crankcase and therefore, an additional passage would allow for otherwise built up blowby gas to escape. The operation of a turbocharger in a turbocharged engine is similar to that of an engine running wide open throttle. Therefore, the concentration of blowby gas in the engine head is relatively high. It remains desirable to provide an improved PCV valve design for use in turbocharged engine PCV systems.

SUMMARY OF THE INVENTION

According to one aspect of the invention, a valve assembly is provided for controlling the exit of boosted gas and naturally aspirated gas in a turbocharged motor vehicle engine. The valve assembly includes a housing and a tube disposed in the housing. The housing has a generally cylindrical inner surface. The tube has a generally cylindrical outer surface. The outer surface is substantially concentric with the inner surface of the housing and spaced apart therefrom to define a bypass channel. The tube as a generally cylindrical inside surface defining a channel that extends substantially through the housing. The valve assembly includes a check valve disposed in the tube for controlling the airflow between the bypass channel and the boosted channel. The check valve has a valve body with a central channel and at least one vent extending between the central channel and the inside surface of the tube. The valve body is movable between a first position in which the vent is aligned with a flow aperture in the tube to allow airflow through the bypass channel and a second position in which the vent is blocked by the inside surface of the tube to prevent airflow therethrough and allow airflow through the boosted channel.

According to another aspect of the invention, a valve assembly is provided for controlling the flow of boosted gas and naturally aspirated gas in a turbocharged motor vehicle engine. The valve assembly includes a housing defining a first channel through which the natural aspirated gas can pass and a second channel through which the boosted gas can pass. The housing encloses both a check valve and a PCV valve in the second channel. The check valve controls the flow of gas between the first and second channels during normal and boosted engine operation, respectively.

BRIEF DESCRIPTION OF THE DRAWINGS

Advantages of the present invention will be readily appreciated as the same becomes better understood by reference to the following detailed description when considered in connection with the accompanying drawings, wherein:

FIG. 3 is a cross sectional view of the two-way valve in a bypass or normally aspirated engine operating mode where air intake is fed through the two-way valve into the engine head cover;

FIG. 4 is a cross sectional view of the two-way valve in a bypass or normally aspirated engine operating mode where blowby gas is released from the engine head cover to the intake.

DETAILED DESCRIPTION OF THE INVENTION

Figure 1:
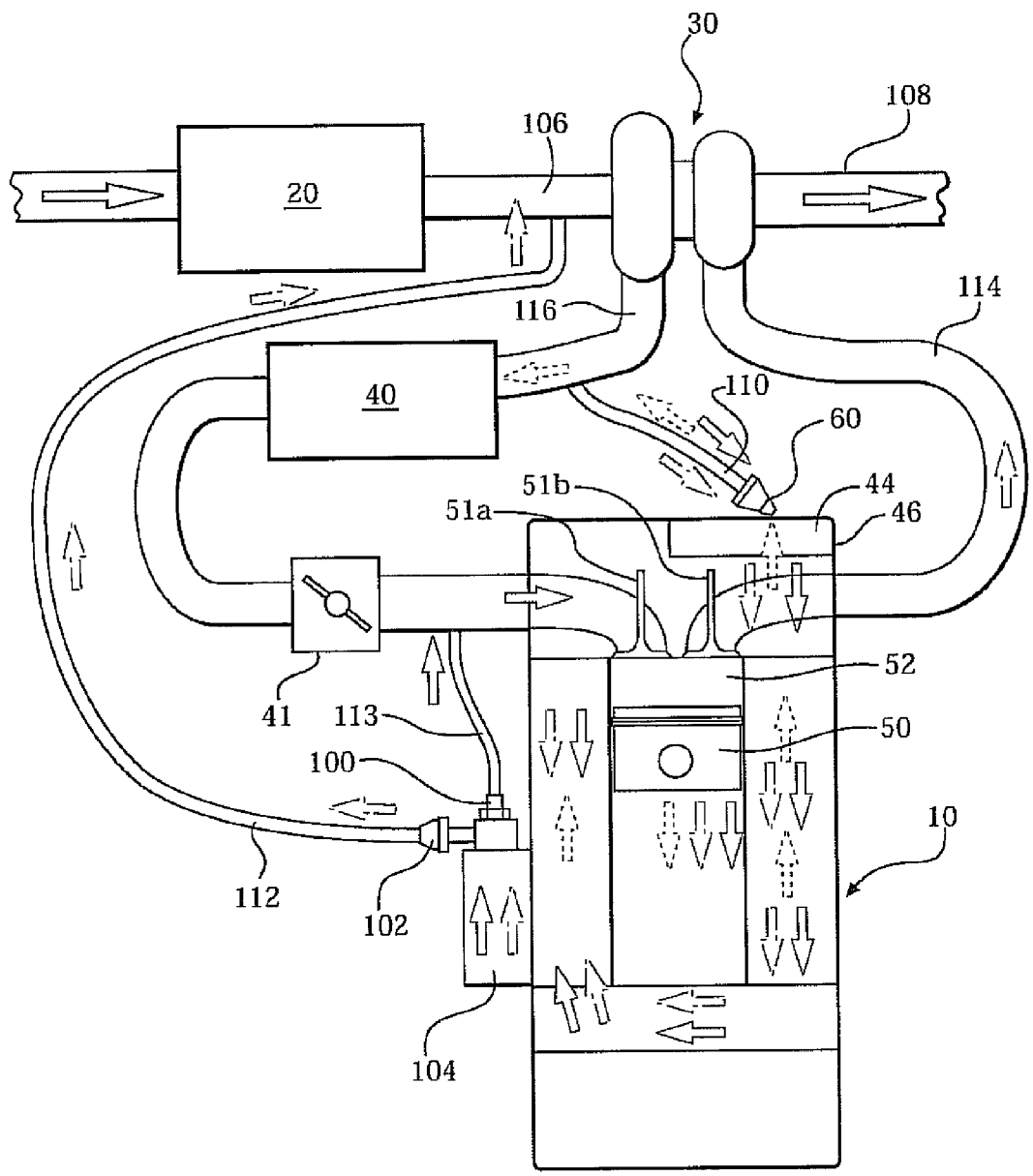
FIG. 1 is a schematic of a turbocharged engine and a PCV system according to one embodiment of the invention.

Referring to FIG. 1, a turbocharged engine for a motor vehicle is generally indicated at 10. The engine 10 includes a reciprocating piston 50 and cylinder 52 arrangement. The piston 50 is driven within the cylinder 52 from the combustion of air/fuel mixture introduced and subsequently ignited by sparkplugs (not shown). As the combustion causes expansion of the air/fuel mixture in a gaseous form, various conduits are provided for which these gases may escape as well as be introduced into the engine 10.

The engine 10 includes a turbocharging system having an air cleaner 20, a turbo unit 30 and an air intercooler 40. As indicated by the arrows, filtered ambient air exits the air cleaner 20 and continues through a first air inlet 106 of the turbo unit 30. When the turbo unit 30 is activated, boosted air exits the turbo unit 30 and enters a combustion chamber of the cylinder 52 via air introducing conduit 116 where the air is mixed with vaporized fuel from a first auxiliary conduit 112 and ignited to cause a downward or power stroke of the piston 50. Combusted air is then released to the environment via exhaust conduit 114. Throttle 41 controls the fuel mixed with air. The amount of air/fuel mixture introduced into the combustion chamber as well as the exhaust leaving the combustion chamber are regulated by intake valve 51a and exhaust valve 51b respectively.

The fresh air is delivered to head cavity via second air inlet 110 and a two-way valve 60 to provide ventilation at the head cover. This ventilation is desired as it will maintain engine performance by preventing oil deterioration due to prolonged exposure to engine gases. When the turbo unit 30 is not activated, naturally aspirated air passes through the turbo unit 30 along air introducing conduit 116. As the engine 10 operates gases may build up within the engine 10. Conduits serve as a means for ventilation and are provided to recycle back into the engine 10 and also prevent harmful gases from escaping into the environment. The first auxiliary conduit 112 extends between the engine oil separator 104 and a portion of the first air inlet 106, and a second auxiliary conduit 113 extends between the engine oil separator 104 and a portion of the air introducing conduit 116 is provided to allow for engine ventilation. The first auxiliary conduit 112 is fitted with an engine oil separator check valve 102 to prevent air from entering into the engine oil separator 104. The second auxiliary conduit 113 is fitted with a one-way Positive Crankshaft Ventilation (PCV) valve 100. The one-way PCV valve 100 allows gas to escape from the engine oil separator 104 only when a predetermined pressure is reached within the engine oil separator 104. However, there may still exist conditions where pressure within the head cover 46 needs to be relieved. Typically, the pressure is relieved by having the gases forced through either the engine oil separator check valve 102 or the one-way PCV valve 100. Furthermore, it may be desirable to have air enter the head cover 46 directly.

Accordingly, an improved Positive Crankshaft Ventilation (PCV) system is provided for ventilating harmful PCV gases in the engine 10 during boosted operation, naturally aspirated air operation, and provides an additional means for introducing air into the head cover 46. In one embodiment, the PCV system utilizes a two-way valve 60 that facilitates controlled two-way air flow between a second air inlet 110 leading into the air intercooler 40 and a head cover oil separator 44 disposed in a head cover 46 of the engine 10 as the engine 10 operates between normally aspirated and boosted engine 10 operating conditions. Specifically, the two-way valve 60 allows built up air in the head cover 46 to be released back into the air introducing conduit 116, while under other engine 10 conditions allows air to be introduced from the air introducing conduit 116 into the engine 10 head cover 46, or air from the head cover 46 to flow from the engine 10 head cover 46 to the air introducing conduit 116.

Referring to FIGS. 2-5, the two-way valve 60 includes a housing 64 having a housing inlet 62 and a housing outlet 68. The housing 64 also has a generally cylindrical inner surface 63. A tube 66 having an outer surface 67 extends through the housing 64. A normally aspirated or bypass channel 65 is defined between the inner surface 63 of the housing 64 and the outer surface 67 of the tube 66. The outer surface 67 may be generally cylindrically shaped. The outer surface 67 may also be concentric with respect to the inner surface 63 of the housing 64.

The tube 66 defines a longitudinally extending boosted channel 69 having a first chamber 69a and a second chamber 69b. The first and second chambers 69a, 69b are generally separated by a middle wall 82. A central aperture 89 formed in the middle wall 82 allows airflow between the chambers 69a, 69b. The boosted channel 69 may be generally concentric relative to the bypass channel 65.

The two-way valve 60 includes a check valve 70 enclosed in the housing 64 for controlling the flow of air between the bypass and boosted channels 65, 69. The check valve 70 is pressed against a stopper 79. The stopper 79 is ring shaped to allow a portion of the check valve 70 to pass through. The stopper 79 is disposed between the housing outlet 68 and the check valve 70, thus forcing air to flow from the housing outlet 68 into the check valve 70, and vice-versa. The check valve 70 includes a valve body 72 disposed in the first chamber 69a of the tube 66. The check valve 70 also includes a ball 74, a ball support 78, a ball biasing member 76, and a first biasing member 80. The valve body 72 is fitted within the tube 66 such that the valve body 72 slides along the interior surface 81 of the tube 66. The valve body 72 includes a center channel 71, a valve body entrance 73 leading into the center channel 71 from the housing inlet 62, a valve body exit 83 extending from the center channel 71, and at least one vent 75 extending between the center channel 71 and the inside surface of the tube 66. The valve body 72 in the illustrated embodiment includes a plurality of vents 75 extending radially from the center channel 71.

Figure 5:
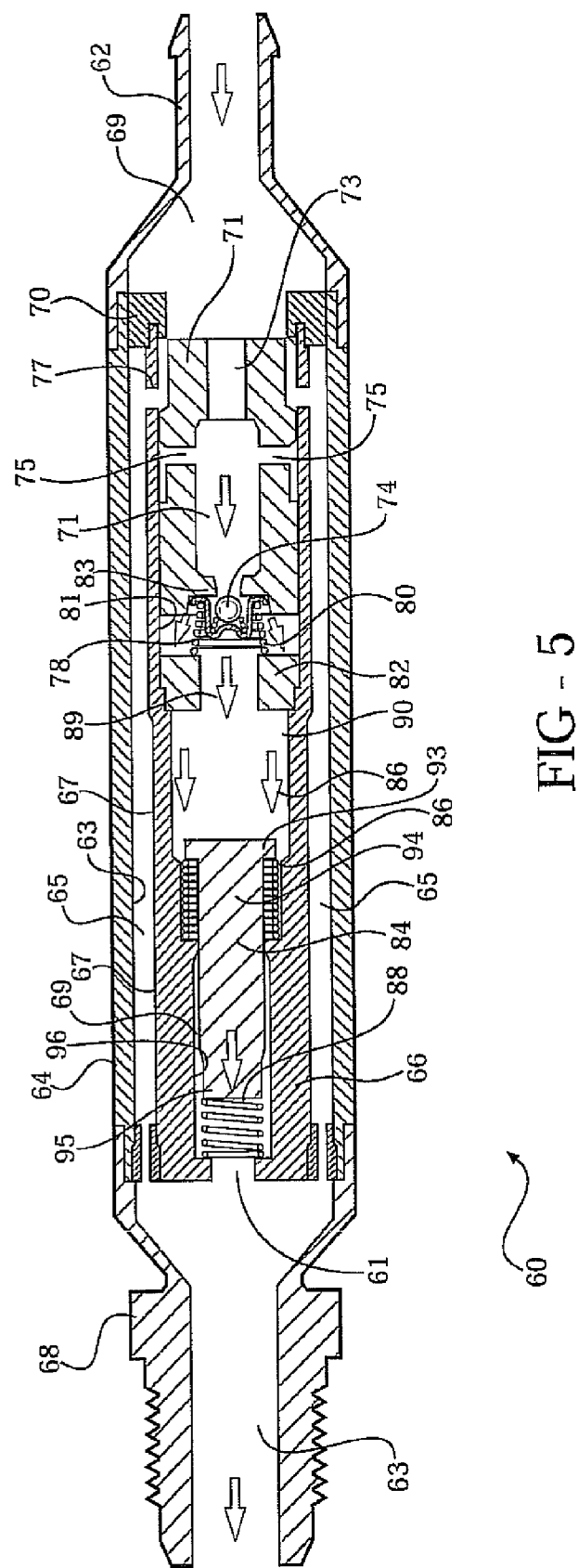
FIG. 5 is a cross sectional view of the two-way valve in a turbocharged or boosted engine operating mode.

The valve body 72 is movable between a first position, as shown in FIGS. 3 and 4, and a second position, as shown in FIG. 5. In the first position, the vents 75 in the valve body 72 are aligned with corresponding flow apertures 77 formed in the tube 66 to allow normally aspirated gas to move between the housing inlet 62 and the bypass channel 65. A recess 75a may be formed in an outer surface 67 of the valve body 72 to accommodate some axial movement of the valve body 72 on either side 97 of the nominal first position and allow gas flow between the housing inlet 62 and the bypass channel 65.

Figure 2:
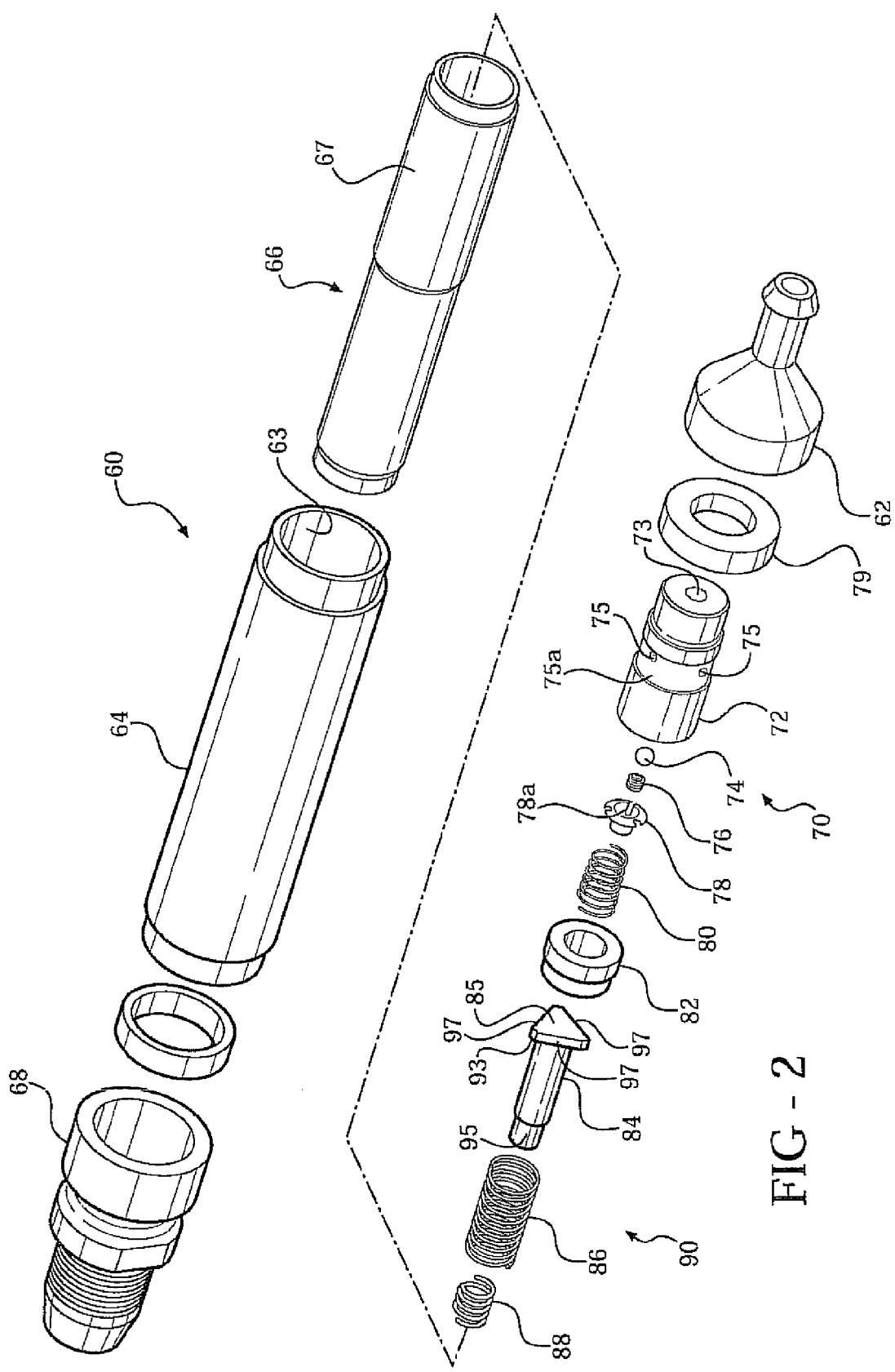
FIG. 2 is an exploded perspective view of a two-way valve of the PCV system.

In the second position, the vents 75 and flow apertures 77 are not aligned, thereby blocking airflow to the bypass channel 65. In this position, the airflow is forced onto the ball 74, causing the ball 74 to compress the ball biasing member 76 thus providing a path through the center channel 71 of the valve body 72 for the air to leave the valve body 72 via the valve body exit 83. Specifically, the ball 74 is seated along the valve body exit 83 of the valve body 72 and retained in that position by the ball support 78. The first biasing member 80 is energized or compressed between a middle wall 82 fixed inside of the tube 66 and the ball support 78. The first biasing member 80 biases the valve body 72 toward the first position. As best shown in FIG. 2, the ball support 78 includes at least one slot 78a allowing the boosted air to move between the exit 83 of the valve body 72 and the center aperture in the middle wall 82.

A PCV valve 90 is disposed in the second chamber 69b of the boosted channel 69. The PCV Valve 90 has a second biasing member 86 and a plunger 84. The plunger 84 is disposed in the boosted channel 69 and slidable between closed and open positions, as shown in FIGS. 4 and 5, respectively. The second biasing member 86 continuously biases the plunger 84 toward the middle wall 82. The plunger 84 includes a head portion 93, a second end 95, and a generally cylindrically shaped shaft or middle portion 94 extending axially between the first and second ends 95. As best shown in FIG. 2, the head portion 93 of the plunger 84 is generally triangular shaped with sides 97 spaced apart from the inner surfaces 63 of the housing 64 that define the boosted channel 69 to allow boosted gases to pass therebetween. A generally planar end surface 85 is formed on the head portion 93 of the plunger 84 which faces the middle wall 82. The end surface and the middle wall 82 are generally parallel to each other.

The first chamber 69a of the boosted channel 69 includes leading and trailing portions 91, 92. The second biasing member 86 is disposed in the leading portion 91 of the first chamber 69a. The second biasing member 86 is concentric with and extends over the middle portion 94 of the plunger 84. The second biasing member 86 is compressed axially between the first end and an annular locating edge disposed between the leading and trailing portions 91, 92 of the first chamber 69a.

The second chamber 69b of the boosted channel 69 has a smaller diameter than the first chamber 69a. The second chamber 69b receives the middle portion 94 and second end 95 of the plunger 84. The middle portion 94 and second end 95 of the plunger 84 are radially spaced apart from the inner surface boosted channel 96 of the housing 64 to allow the air to flow therethrough. A third biasing member 88 is disposed in the second chamber 69b. The third biasing member 88 is spaced apart from the second end 95 of the plunger 84 in the closed position, as shown in FIG. 3. The third biasing member 88 may contact and bias the plunger 84 toward the middle wall 82 as the plunger 84 is displaced toward the open position, as shown in FIG. 4.

In use, the two-way valve 60 allows naturally aspirated gas to pass between the air inlet and the oil separator during normal engine 10 operation, In this mode, the valve body 72 in the check valve 70 is in the first position with the vents 75 in the valve body 72 aligned with the flow apertures 77 in the tube 66. In this position, air is allowed to flow through the center channel 71 of the valve body 72 and then through the bypass channel 65.

When pressure in the center channel 71 reaches a predetermined threshold value, i.e. when the turbocharger is activated, the valve body 72 is displaced against the force applied by the first biasing member 80 toward the second position. In this position, the vents 75 and flow apertures 77 are not aligned and air flows through the boosted channel 69 instead of the bypass channel 65. Specifically, air flow is directed towards the ball 74, forcing the ball 74 against ball biasing member 76. The ball biasing member 76 is compressed and the ball 74 is displaced from the exit 83 of the valve body 72 to allow the air to pass from the center channel 71 via the exit 83 and toward the boosted channel 69. Airflow through the boosted channel 69 opens the PCV valve 90 by causing generally axial displacement of the plunger 84 in the direction of the airflow or toward the valve outlet. The second biasing member 86 is axially compressed by the displacement of the plunger 84 toward the valve outlet. The plunger 84 may also contact and compress the third biasing member 88.

When the pressure in the center channel 71 drops below the threshold value, i.e. when the turbocharger is not active and/or offline, the first biasing member 80 urges the valve body 72 toward the first position. Thus, vents 75 are aligned with flow apertures 77 providing a passage for air to flow through. As air is provided with a means of escape, check valve 70 spring maintains sufficient pressure against the ball 74 thereby position ball 74 to block air flow through exit 83 of the valve body 72. The second and third biasing members 86, 88 return the plunger 84 to the closed position. Accordingly, air is allowed to move freely in either direction along bypass. For example, air travelling along the air inlet towards the engine 10 may be introduced directly into the head cover 46 as shown in FIG. 3. Alternatively, a high concentration of air or blowby gas at the head cover 46 may be directed back into the air inlet as shown in FIG. 4 to help relieve air pressure in the head cover 46 and reduce the associated build up of residue caused by prolonged periods of high air or blowby gas concentration.

The two-way valve 60 provides for normally aspirated and boosted airflow through a single housing 64 disposed in series with the pipeline between the air inlet leading into the intercooler and the oil separator in the head cover 46. This single housing 64 design simplifies the engine 10 by eliminating the need to modify the engine 10 system, in particular, the engine 10 castings. Thus, common engine 10 castings may be designed for use in both turbocharged and non-turbocharged engines 10.

In another embodiment of the invention, the engine 10 includes a second PCV valve 90 and a one-way valve disposed between a second oil separator and a low-pressure air inlet leading into the turbo unit 30. The PCV valve 90 in the two-way valve 60 and the second PCV valve 90 adjacent the one-way valve work together to draw vapors from the head cover 46. The vapor is then carried with the fuel/air mixture through the air introducing conduit 116 back to the combustion chambers 69a, 69b where it is burned during the combustion cycle. The PCV system of the present embodiment provides improved ventilation of PCV gases during boosted operation of the turbocharged engine 10 versus conventional systems.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A valve assembly for controlling the flow of boosted gas and naturally aspirated gas in a turbocharged motor vehicle engine, said valve assembly comprising:
    a housing having a generally cylindrical inner surface;
    a tube disposed in the housing and having a generally cylindrical outer surface, the outer surface being substantially concentric with the inner surface of the housing and spaced apart therefrom to define a bypass channel, the tube having a generally cylindrical inside surface defining a boosted channel that extends substantially through the housing;
    a check valve disposed in the tube for controlling the airflow between the bypass channel and the boosted channel, the check valve having a valve body with a central channel and at least one vent extending between the central channel and the inside surface of the tube, the valve body being movable between a first position in which the vent is aligned with a flow aperture in the tube to allow airflow through the bypass channel and a second position in which the vent is blocked by the inside surface of the tube to prevent airflow therethrough and allow airflow through the boosted channel.

2. The valve assembly as set forth in claim 1, wherein the boosted channel is substantially concentric relative to the bypass channel.

3. The valve assembly as set forth in claim 1, wherein the boosted channel includes a first chamber and a second chamber, the tube having a middle wall separating the first and second chambers and having a flow aperture to allow airflow between the first and second chambers.

4. The valve assembly as set forth in claim 3, wherein the check valve is disposed in the first chamber.

5. The valve assembly as set forth in claim 4, wherein the check valve includes a first biasing member extending between the middle wall and the valve body for biasing the valve body toward the first position.

6. The valve assembly as set forth in claim 5, wherein the valve body includes an entrance leading into the central channel and an exit extending from the central channel toward the middle wall.

7. The valve assembly as set forth in claim 6, wherein the check valve includes a ball retained over the exit of the valve body by a ball support, the first biasing member extending between the middle wall and the ball support.

8. The valve assembly as set forth in claim 7, wherein the ball support includes at least one slot allowing boosted air to move between the exit of the valve body and the flow aperture in the middle wall.

9. The valve assembly as set forth in claim 3 including a PCV valve disposed in the second chamber of the boosted channel, the PCV valve having a plunger movable between closed position adjacent the middle wall and an open position spaced apart from the middle wall, the PCV valve having a second biasing member for biasing the plunger toward the closed position.

10. The valve assembly as set forth in claim 1, wherein the valve body includes a recess that extends from the vent so that the vent and flow aperture remain in fluid communication during movement of the valve body on either side of a nominal first position thereby allowing gas flow between the inlet and the bypass channel.

11. A valve assembly for controlling the flow of boosted gas and naturally aspirated gas in a turbocharged motor vehicle engine, said valve assembly comprising:

a housing defining a first channel through which the natural aspirated gas can pass and a second channel through which the boosted gas can pass, the housing enclosing both a check valve and a PCV valve in the second channel, the check valve controlling the flow of gas between the first and second channels during normal and boosted engine operation, respectively.

12. The valve assembly as set forth in claim 11, wherein the check valve includes a valve body having a central channel and at least one vent extending outwardly from the central channel.

13. The valve assembly as set forth in claim 12, wherein the valve body is movable between a first position in which the vent is aligned with a corresponding flow aperture leading into the first channel to allow the flow of gas therethrough and a second position in which with vent and flow aperture are not aligned to force airflow through the second channel.

14. The valve assembly as set forth in claim 12, wherein the valve body includes a plurality of vents each extending radially outwardly from the central channel.

15. The valve assembly as set forth in claim 11, wherein second channel includes a first chamber enclosing the check valve and a second chamber enclosing the PCV valve, the first and second chambers being separated by a middle wall having a central aperture.

16. The valve assembly as set forth in claim 15, wherein the second chamber has a smaller diameter than the first chamber.

17. The valve assembly as set forth in claim 16, wherein the PCV valve includes a plunger having a generally triangular shaped head portion and a generally cylindrical shaft extending therefrom.

18. The valve assembly as set forth in claim 17, wherein tie second chamber includes a reduced diameter portion that slidably receives the shaft of the plunger.

19. The valve assembly as set forth in claim 17, wherein the head portion includes a substantially planar end surface.

20. The valve assembly as set forth in claim 19, wherein the end surface is generally parallel with the middle wall.

* * * * *